United States Patent
Faber et al.

(10) Patent No.: US 6,947,561 B1
(45) Date of Patent: Sep. 20, 2005

(54) METHOD AND APPARATUS FOR PROTECTING COPY CONTROL INFORMATION PROVIDED TO A VIDEO RECORDING DEVICE

(75) Inventors: Robert W. Faber, Hillsboro, OR (US); Brendan Traw, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 771 days.

(21) Appl. No.: 09/608,996

(22) Filed: Jun. 30, 2000

Related U.S. Application Data (63) Continuation-in-part of application No. 09/385,590, filed on Aug. 29, 1999, now Pat. No. 6,477,252, and a continuation-in-part of application No. 09/385,592, filed on Aug. 29, 1999, now Pat. No. 6,731,758.

(51) Int. Cl.⁷ ............................ H04N 7/167; H04L 9/00
(52) U.S. Cl. ...................................... 380/203; 380/259
(58) Field of Search ..................... 380/203, 200–202, 380/259, 37, 42, 262; 713/259; 705/51, 52

(56) References Cited

U.S. PATENT DOCUMENTS

| | | |
|---|---|---|
| 4,316,055 A | 2/1982 | Feistel |
| 4,613,901 A | 9/1986 | Gilhousen et al. |
| 4,953,208 A | 8/1990 | Ideno |
| 5,020,106 A | 5/1991 | Rabold et al. |
| 5,029,207 A | 7/1991 | Gammie |
| 5,195,136 A | 3/1993 | Hardy et al. |
| 5,509,073 A | 4/1996 | Monnin |
| 5,590,194 A | 12/1996 | Ryan |
| 5,621,799 A | 4/1997 | Katta et al. |
| 5,673,319 A | 9/1997 | Bellare et al. |
| 5,825,879 A | 10/1998 | Davis |
| 5,852,472 A | 12/1998 | Prasad et al. |
| 5,862,150 A | 1/1999 | Lavelle et al. |
| 5,940,509 A | 8/1999 | Jovanovich et al. |

(Continued)

FOREIGN PATENT DOCUMENTS

| | | |
|---|---|---|
| EP | 0 599 366 | 2/1993 |
| WO | WO 96-06504 | 2/1996 |
| WO | WO 99/19822 | 9/1998 |
| WO | WO 99/18729 | 4/1999 |
| WO | WO 01-17251 | 3/2001 |
| WO | WO 01/17252 A1 | 3/2001 |

OTHER PUBLICATIONS

Schneier, Bruce; "Applied Cryptography, Second Edition, Protocols, Algorithms, and Source Code in C"; John Wiley & Sons, Inc.; Copyright 1996; Chapters 2–6 and 12–17.

(Continued)

*Primary Examiner*—Kim Vu
*Assistant Examiner*—Brandon Hoffman
(74) *Attorney, Agent, or Firm*—Blakely, Sokoloff, Taylor & Zafman LLP (57) ABSTRACT

A video source device includes a cipher unit. The cipher unit includes a block cipher and a stream cipher. The video source device uses the block cipher to generate at least one cipher key for use by the stream cipher to generate cipher bits for ciphering video to be transmitted to a video recording device. The video source device further provides n bits of copy control information to the video recording device. The video source device incorporates the n-bit copy control information as part of an initialization value, and initializes a register of a round function of the block cipher with the initialization value. The video recording device also includes a cipher unit of like kind, and operates the block and stream ciphers in like manner to decipher the ciphered video received from the video source device. Upon receiving the n-bit copy control information, the video recording device also forms an initialization value and initializes a corresponding register of the corresponding round function of its block cipher. Accordingly, protection is provided to the copy control information.

7 Claims, 7 Drawing Sheets

U.S. PATENT DOCUMENTS

| | | | |
|---|---|---|---|
| 6,005,940 | A | 12/1999 | Kulinets |
| 6,061,449 | A | 5/2000 | Candelore et al. |
| 6,167,136 | A | 12/2000 | Chou |
| 6,289,102 | B1 * | 9/2001 | Ueda et al. ............... 380/201 |
| 6,453,304 | B1 * | 9/2002 | Manabu et al. ............ 380/201 |
| 6,654,883 | B1 | 11/2003 | Tatebayashi |

OTHER PUBLICATIONS

Search Report for PCT/US 00/22834, mailed Dec. 4, 2000, 2 pages.

Search Report for PCT/US 00/22785, mailed Dec. 6, 2000, 2 pages.

Written Opinion for PCT/US00/22834; 1 page.

Written Opinion for PCT/US/00/22785; 1 page.

International Preliminary Examination Report PCT/US00/22834. 6 Pages. Mailed Nov. 19, 2001.

International Preliminary Examination Report PCT/US00/22785. 7 Pages. Mailed Nov. 5, 2001.

Heys, Howard M., An Analysis of the Statistical Self–Synchronization of Stream Ciphers, IEEE Infocom 2001, pp. 897–904.

Heys, Howard M., Delay Characteristics of Statistical Cipher Feedback Mode, IEEE 2001, pp. 5–9.

Simmons, Gustavus J., Symmetric and Asymmetric Encryption, Computing Surveys, vol. 11, No. 4, Dec. 1979, pp. 305–330.

The Art Of Computer Programming, vol. 2/Seminumerical Algorithms, ©1969, Addison–Wesley Publishing Company, Inc., Reading, Massachusetts; Menlo Park, California; London; Amsterdam; Don Mills, Ontario; Sydney; pp. 30–31.

High–bandwidth Digital Content Protection System, Revision 1.0, Feb. 17, 2000, Copyright ©1999–2000 by Intel Corporation, pp. 1–59.

* cited by examiner

METHOD AND APPARATUS FOR PROTECTING COPY CONTROL INFORMATION PROVIDED TO A VIDEO RECORDING DEVICE

RELATED APPLICATION

This application is a continuation-in-part application to U.S. patent applications Ser. No. 09/385,590, now U.S. Pat. No. 6,477,252 and Ser. No. 09/385,592, now U.S. Pat. No. 6,731,758, both entitled Digital Video Content Transmission Ciphering and Deciphering Method and Apparatus, filed on Aug. 29, 1999.

BACKGROUND OF THE INVENTION

1. Field of the Invention

The present invention relates to the field of content protection. More specifically, the present invention addresses the generation of pseudo random numbers for use in a symmetric ciphering/deciphering process based authentication process for authenticating video receiving devices.

2. Background Information

In general, entertainment, education, art, and so forth (hereinafter collectively referred to as "content") packaged in digital form offer higher audio and video quality than their analog counterparts. However, content producers, especially those in the entertainment industry, are still reluctant in totally embracing the digital form. The primary reason being digital contents are particularly vulnerable to pirating. As unlike the analog form, where some amount of quality degradation generally occurs with each copying, a pirated copy of digital content is virtually as good as the "gold master". As a result, much effort has been spent by the industry in developing and adopting techniques to provide protection to the distribution and rendering of digital content.

Historically, the communication interface between a video source device (such as a personal computer) and a video sink device (such as a monitor) is an analog interface. Thus, very little focus has been given to providing protection for the transmission between the source and sink devices. With advances in integrated circuit and other related technologies, a new type of digital interface between video source and sink devices is emerging. The availability of this type of new digital interface presents yet another new challenge to protecting digital video content. While in general, there is a large body of cipher technology known, the operating characteristics such as the volume of the data, its streaming nature, the bit rate and so forth, as well as the location of intelligence, typically in the source device and not the sink device, present a unique set of challenges, requiring a new and novel solution. Parent applications Ser. Nos. 09/385,590 and 09/385,592 disclosed various protocol and cipher/deciphering techniques to authenticate a video sink device and protect transmission to the video sink device. Pseudo random numbers are employed as seed or basis numbers for the ciphering/deciphering process.

As technology advances, it is desired to selectively allow certain video sink devices to make authorized copies of the protected video. According, a method and apparatus to protect the provision of copy control information is desired.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described, and various details will be set forth in order to provide a thorough understanding of the present invention. However, it will be apparent to those skilled in the art that the present invention may be practiced with only some or all aspects of the present invention, and the present invention may be practiced without the specific details. In other instances, well known features are omitted or simplified in order not to obscure the present invention.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 1:
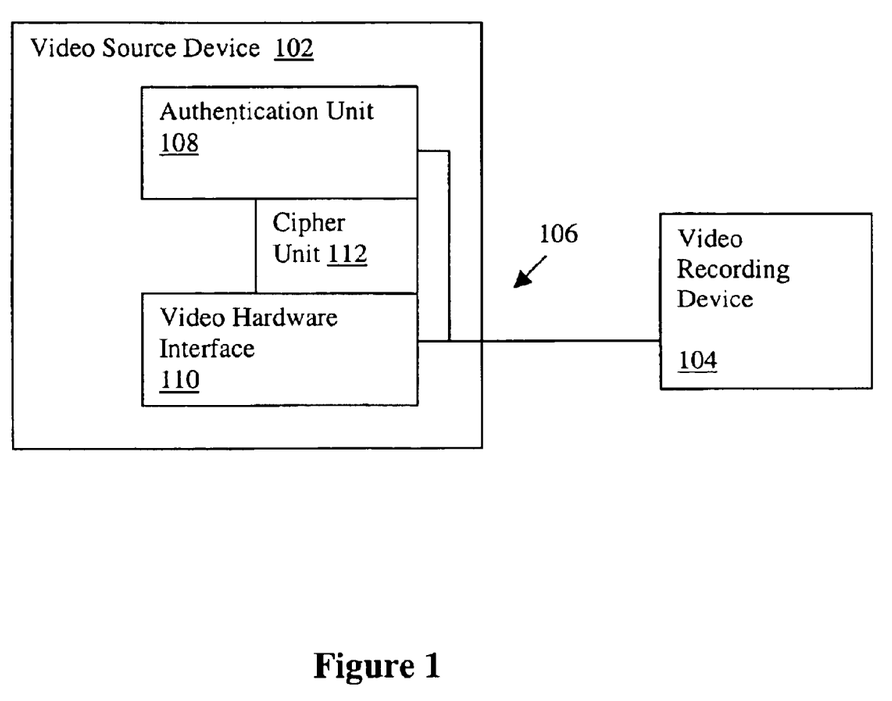
FIG. 1 illustrates an example video source device and an example video sink device incorporated with the teachings of the present invention, in accordance with one embodiment.

Referring now to FIG. 1, wherein a block diagram illustrating an example video source device incorporated with the teachings of the present invention, in accordance with one embodiment, is shown. As illustrated, video source device 102, incorporated with the teachings of the present invention, and video sink or recording device 104 are coupled to each other via digital video link 106. Video source device 102 includes authentication unit 108 and video hardware interface 110, sharing cipher unit 112. While not detailed, video sink/recording device 104 is also similarly constituted with its own authentication unit, hardware interface and cipher unit. Video source device 102, using authentication unit 108, authenticates video sink/recording device 104. Authentication unit 108 employs an authentication process that is based on a symmetric ciphering/deciphering process, requiring a seed or basis value to be provided by authentication unit 108. The seed or basis value is a pseudo random number. Upon authenticating video sink/recording device 104, video source device 102 generates and provides video content to video sink/recording device 104 through video hardware interface 110, which ciphers video content before transmission to protect the video content from unauthorized copying. Video hardware interface 110 ciphers the video content using ciphering bits generated by cipher unit 112. In accordance with the present invention, video source device 102 also provides copy control information to video sink/recording device 104 to specifically authorize and control copying or recording of the video content provided. Further, video source device 102 also protects these copy control information to prevent their tampering. As will be described in more detail below, video source device 102 advantageously protects these copy control information by coupling or tying them to the symmetric ciphering and deciphering process employed to protect the video content. As a result, the copy control information can not be tampered with, as tampering with the copy control information will cause video sink/recording device 104 to be unable to decipher the ciphered video.

The exact nature of these copy control information is application dependent and of no particular relevance to the practice of the present invention. Similarly, the communication interface employed (not shown) as well as the communication protocol employed by video source device 102 to convey the copy control information to video sink/recording device is also of no particular relevance to the practice of the present invention. Any communication link and protocol known in the art may be employed.

Except for the teachings of the present invention incorporated, to be described more fully below, video source device 102 is intended to represent a broad range of digital devices known in the art, including but not limited to computers of all sizes (from palm size device to desktop device, and beyond), set-up boxes, or DVD players. Examples of video recording devices include but are not limited to computing devices with storage medium, "digital VCR" and the like. As to digital video link 106, it may be implemented in any one of a number of mechanical and electrical forms, as long as they are consistent with the operating requirement (i.e. speed, bit rate and so forth), and a mechanism (which may be in hardware or through protocol) is provided to allow control information to be exchanged between video source and sink/recording devices 102 and 104.

Before proceeding to describe the present invention in further detail, it should be noted that video sink/recording device 104 may also be disposed "behind" a video signal repeater device, repeating signals for the "remotely" disposed video sink/recording device 104, as opposed to being directly coupled to video source device 102 as illustrated.

Figure 2:
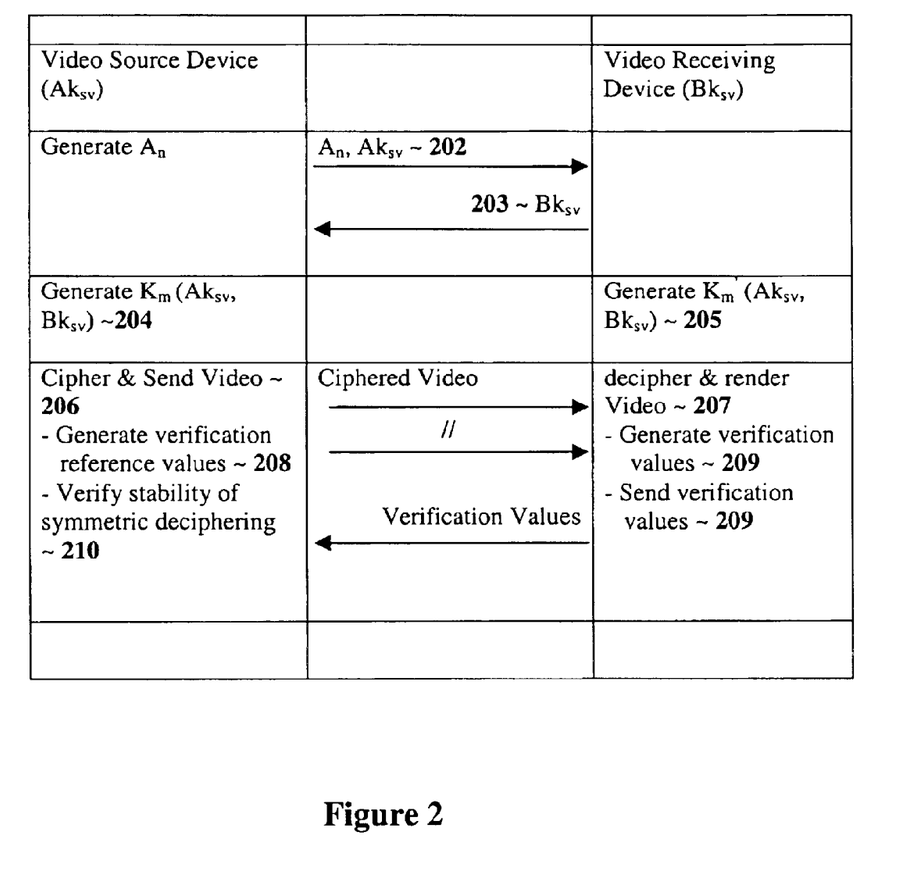
FIG. 2 illustrates an overview of the method of the present invention for protecting video provided by video source device to video recording device, in accordance with one embodiment.

FIG. 2 illustrates an overview of the symmetric ciphering/deciphering process based method for providing video content from a source device to a sink/recording device, in accordance with one embodiment. In this embodiment, source and sink/recording devices 102 and 104 are assumed to have each been provided with an array of private keys and a complementary identifier by a certification authority. As illustrated, upon power on or reset, source device 102 first provides a basis value to the symmetric ciphering/deciphering process to sink/device device 104 (block 202). For the illustrated embodiment, the basis value is a random number ($A_n$). $A_n$ may be generated in any one of a number of techniques known in the art. Additionally, source device 102 also provides a selected one of its device keys ($Ak_{sv}$) to sink/recording device 104 (block 202). In response, sink/recording device 104 replies with a selected one of its device keys ($Bk_{sv}$) (block 203). Upon exchanging the above information, source and sink/recording devices 102 and 104 independently generate their respective copies of an authentication key ($K_m$) using $Ak_{sv}$ and $Bk_{sv}$ (block 204 and 205). For the illustrated embodiment, source device 102 generates its copy of $K_m$ by summing private keys of its provided array indexed by $Bk_{sv}$, while sink/recorder device 104 generates its copy of Km by summing private keys of its provided array indexed by $Ak_{sv}$. At this time, if both source and sink devices 102 and 104 are authorized devices, they both possess and share a common secret authentication key $K_m$.

In one embodiment, each of source and sink/recording devices 102 and 104 is pre-provided with an array of 40 56-bit private keys by the certification authority. $A_n$ is a 64-bit random number, and $K_m$ is 56-bit long. For more information on the above described authentication process, see co-pending U.S. patent application, Ser. No. 09/275,722, filed on Mar. 24, 1999, entitled Method and Apparatus for the Generation of Cryptographic Keys, having common inventorship as well as assignee with the present application.

Having authenticated sink/recording device 104, source device 102 ciphers video content into a ciphered form before transmitting the video content to sink device 104. Source device 102 ciphers the video content employing a symmetric ciphering/deciphering process, and using the random number ($A_n$) as well as the independently generated authentication key ($K_m$) (block 206). Upon receipt of the video content in ciphered form, sink/recording device 104 deciphers the ciphered video content employing the same symmetric ciphering/deciphering processing, and using the provided $A_n$ as well as its independently generated copy of $K_m$ (block 207).

In accordance with the present invention, as an integral part of ciphering video content, source device 102 derives a set of verification reference values in a predetermined manner (block 208). Likewise, as an integral part of symmetrically deciphering video content sink/reording device 104 also derives a set of verification values in a predetermined manner, and transmits these derived verification values to source device 102 (block 209). Upon receiving each of these verification values, source device 102 compares the received verification value to the corresponding one of the verification reference values to determine and confirm that indeed the ciphered video content is being properly deciphered by sink/recording device 104 (block 210).

For the illustrated embodiment, both source and sink/recording devices 102 and 104 generate the verification reference and verification values continuously, but the verification values are provided from sink/recording device 104 to source device 102 periodically at predetermined intervals.

In one embodiment, the verification reference and verification values are all 64-bits in length, and sink/recording device 104 provides source device 102 with verification values at initialization and every $64^{th}$ frames thereafter.

Figure 3A:
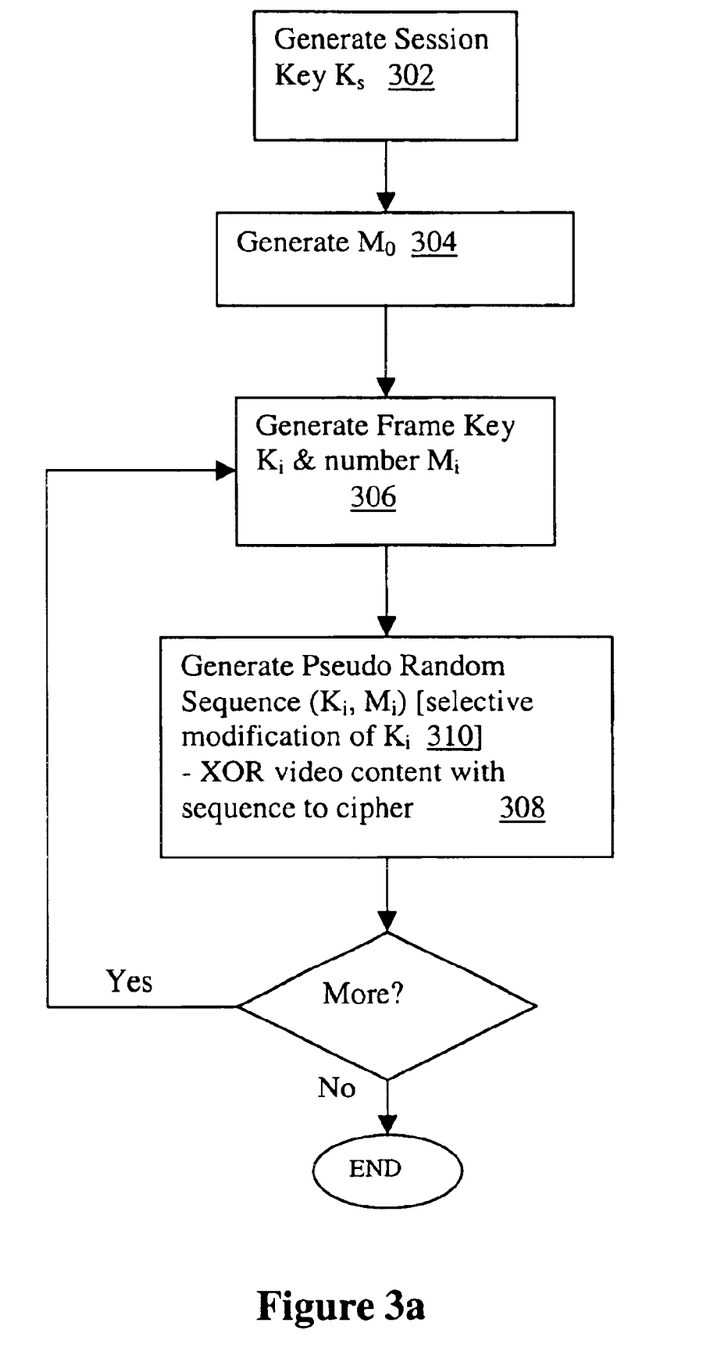
FIGS. 3a–3b illustrate the symmetric ciphering/deciphering process in further detail, in accordance with one embodiment.
Figure 3B:
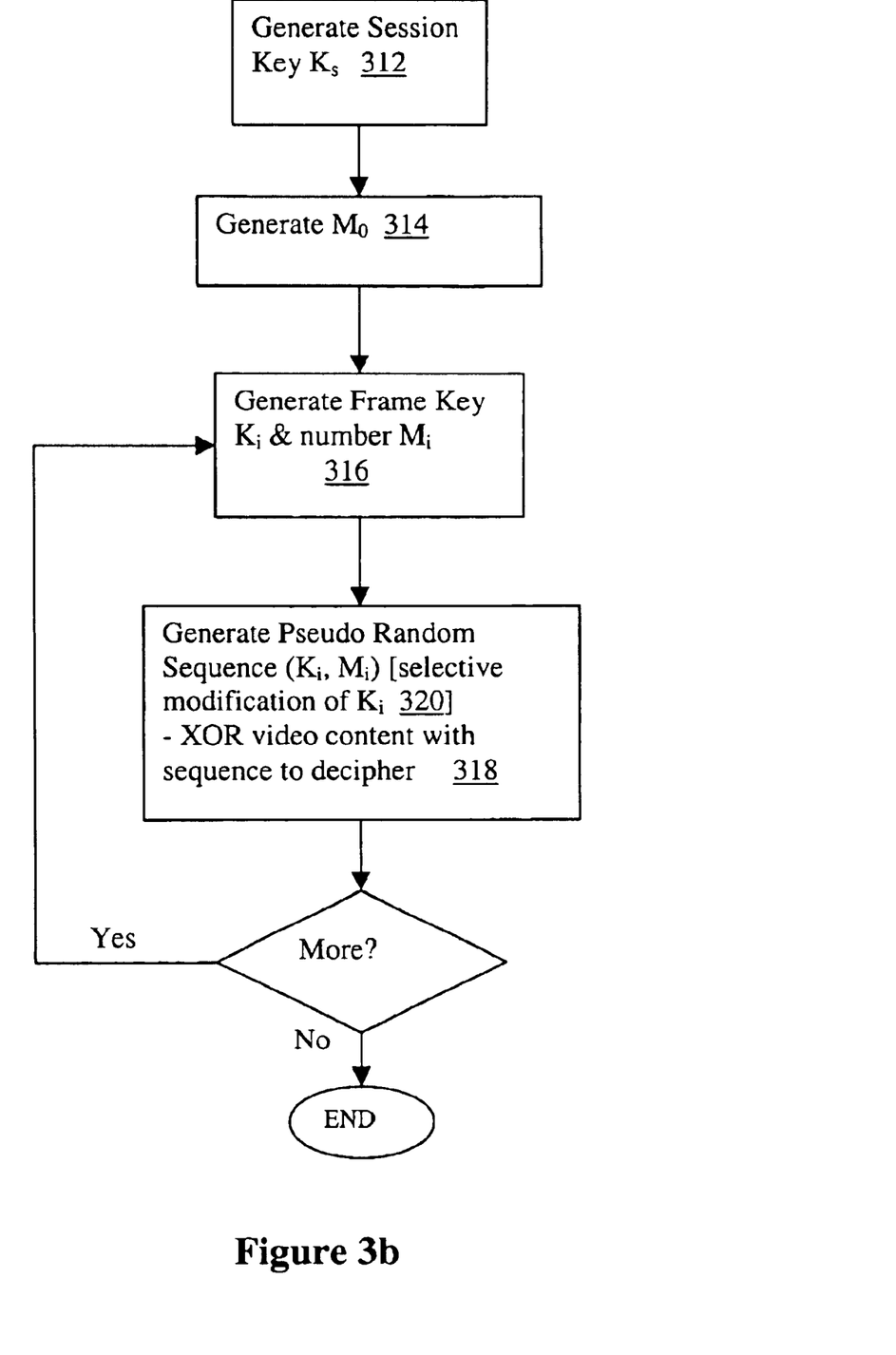

FIGS. 3a–3b illustrate the symmetric ciphering/deciphering process in further detail, in accordance with one embodiment. In this embodiment, the video content is assumed to be a multi-frame video content with each frame having multiple lines of video content. In between two lines of a frame is an interval to allow a sink device to horizontally "retrace" itself, commonly known as the horizontal retrace interval or horizontal blanking interval (HBI). Likewise, in between two frames is an interval to allow a sink device to vertically "retrace" itself, commonly known as the vertical retrace interval or vertical blanking interval (VBI).

Source device 102 first generates a session key ($K_s$) for the transmission session (block 302). For the illustrated embodiment, $K_s$ is generated by block ciphering the above mentioned random number $A_n$ using the authentication key $K_m$ as the block cipher key and applying C1 clocks. The duration of a transmission session is application dependent.

Typically, it corresponds to a natural demarcation of the video content, e.g. the transmission of a single movie may constitute a transmission session, or the transmission of an episode of a sitcom may constitute a transmission session instead.

Upon generating the session key $K_s$, source device 102 generates an initial version of a second random number ($M_0$) (block 304). For the illustrated embodiment, source device 102 first generates a pseudo random bit sequence (at p-bit per clock) using a stream cipher with the above described random number $A_n$, and the session key $K_s$ (in two roles, as another input random number and as the stream cipher key), applying C2 clocks. Source device 102 derives $M_0$ from the pseudo random bit sequence, as the bit sequence is generated.

Next, source device 102 generates a frame key ($K_i$) for the next frame (block 306). For the illustrated embodiment, $K_i$ is generated by block ciphering an immediately preceding version of the second random number $M_i$-1 using the session key $K_s$ as the block cipher key, and applying C3 clocks. That is, for the first frame, frame-1, frame key $K_1$ is generated by block ciphering the above described initial version of the second random number $M_0$, using $K_s$, and applying C3 clocks. Additionally, this operation is subsequently repeated at each vertical blanking interval for the then next frame, frame-2, frame-3, and so forth.

Upon generating the frame key $K_i$, source device 102 generates the current version of the second random number ($M_i$) (block 302). For the illustrated embodiment, source device 102 first generates a pseudo random bit sequence (at p-bit per clock) using a stream cipher with the previous version of the second random number $M_i$-1 and the frame key $K_i$ (in two roles, as another input random number and as the stream cipher key), applying C4 clocks. Source device 102 derives $M_i$ from the pseudo random bit sequence, as the bit sequence is generated.

Upon generating the current version of the second random number $M_i$, source device 102 again generates a pseudo random bit sequence (at p-bit per clock) to cipher the frame (block 308). For the illustrated embodiment, source device 102 generates the pseudo random bit sequence using a stream cipher with an immediately preceding version of the second random number $M_i$-1 and frame key $K_i$ (in two roles, as another input random number and the stream cipher key), applying C5 clocks cycles. The video content is ciphered by perform an exclusive-OR (XOR) operation on the video stream and the pseudo random bit sequence. The pseudo random bit sequence is generated preferably at a rate sufficient to cipher a pixel of RGB signal per clock. Therefore, C5 is equal to the number of bits per pixel multiply by the number of pixels per line, as well as the number of lines per frame.

For the illustrated embodiment, a stream cipher that successively transforms $M_i$ and $K_i$ in the course of generating the pseudo random bit sequence is employed. Additionally, the robustness of the ciphered video content is further strengthened by increasing the unpredictability of the pseudo random bit sequence through successive modification of then current states of $K_i$ the horizontal blanking intervals of the frame (block 310).

Over in sink device 104, in like manner, it first generates a session key ($K_s$) for the transmission session (block 312). Upon generating the session key $K_s$, sink device 104 generates an initial version of the second random number ($M_0$) (block 314). Next, sink device 104 generates the frame key ($K_i$) and second random number ($M_i$) for the next frame (block 316). This operation is likewise subsequently repeated at each vertical blanking interval for the then next frame. In the meantime, after generation of each frame key $K_i$ and $M_i$, sink device 104 generates a corresponding pseudo random bit sequence to decipher the frame (block 318). The ciphered video content is deciphered by performing an exclusive-OR (XOR) operation on the video stream and the corresponding pseudo random bit sequence. Sink device 104 also employs a stream cipher that successively transforms $M_i$ and $K_i$ in the course of generating the pseudo random bit sequence. Furthermore, $K_i$ is successively modified at the horizontal blanking intervals of the frame (block 320). $K_i$, the pseudo random bit sequence, and $M_i$ are symmetrically generated as earlier described for source device 102.

In one embodiment, $K_s$ and each $K_i$ are both 84-bit in length. C1 and C3 are both 48 clocks in length. Each pixel is 24-bit, and the pseudo random bit sequence is generated at 24-bit per clock. Each $M_i$ is 64-bit in length, C3 and C4 are 56 clocks in length. Each 64-bit $M_i$ is formed by concatenating the "lower" 16-bit stream cipher output of each of the last four clocks.

Accordingly, video content may be advantageously transmitted in ciphered form with increased robustness from source device 102 to sink/recording device 104 through link 106 with reduced pirating risk.

Figure 4:
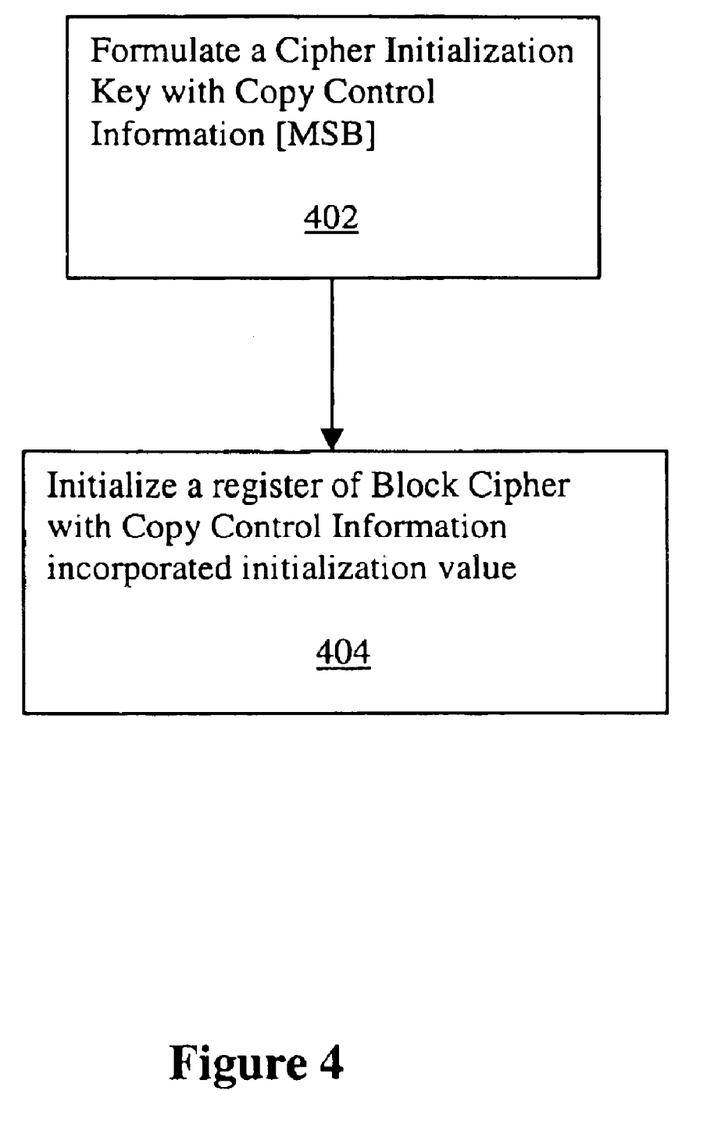
FIG. 4 illustrates an overview of the method of the present invention for protecting copy control information provided by video source device to video recording device, in accordance with one embodiment.

FIG. 4 illustrates an overview of the method of the present invention for protecting the copy control information provided by the video source device to the video sink/recording device, in accordance with one embodiment. For the illustrated embodiment, it is assumed that the copy control information may be expressed as a bit vector of n-bits, where n is an integer. As illustrated, in accordance with the present invention, at power on or reset, 402, prior to the initialization of cipher unit 112, video source device 102 incorporates the n-bit copy control information as an integral part of one of the initialization values to be employed to initialize the cipher unit for protecting the video content. In one embodiment, video source device 102 incorporates the n-bit copy control information as an integral part of an initialization value to be employed to initialize a basis register of a round function of the block cipher section of cipher unit 112. More specifically, in one embodiment, video source device 102 incorporates the n-bit copy control information as the most significant bits (MSB) of the initialization value for the data section round function of the block cipher.

Upon receipt of the copy control information from video source device 102, video sink/recording device 104 would do the same thing, that is incorporating the n-bit copy control information into the corresponding initialization value for a corresponding register of its cipher unit in like manner.

Thereafter, 404, video source and sink/recording device 102 and 104 would correspondingly initialize their cipher units, including the special initialization value (incorporated with the copy control information) among the initialization values to be employed. Accordingly, the copy control information affects the pseudo random sequence subsequently generated by cipher unit 112, and employed to cipher video content as earlier described. In like manner, unless tampered, the corresponding effects will manifest themselves in the pseudo random sequence subsequently generated by the cipher unit of video sink/recording device 104 to decipher the ciphered video content.

In the event the copy control information are tampered with, the correct pseudo random sequence required to decipher the ciphered video content will not be produced, and as a result, the video content will not be available for copy.

Thus, in can be seen from the foregoing, the copy control information are protected from tampering.

Figure 5:
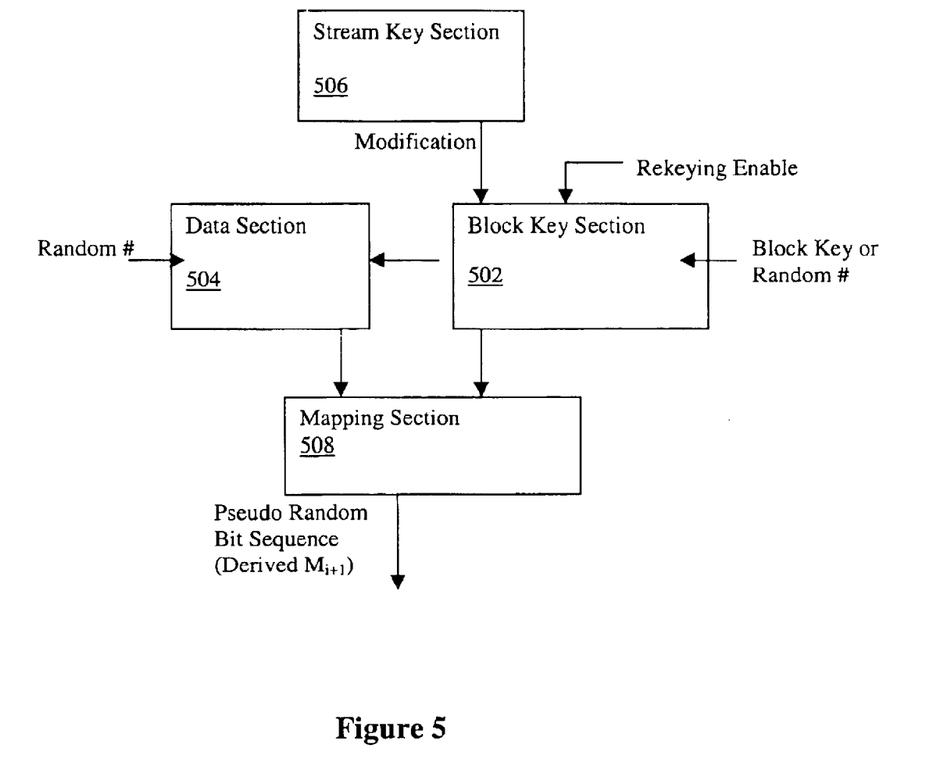
FIG. 5 illustrates an example combined block/stream cipher unit of FIG. 1 in further detail, in accordance with one embodiment.

FIG. 5 illustrates an example combined block/stream cipher suitable for use to practice the present invention, in accordance with one embodiment. As illustrated, combined block/stream cipher 112 includes block key section 502, data section 504, stream key section 506, and mapping section 508, coupled to one another as shown. Block key section 502 and data section 504 are employed in both the block mode as well as the stream mode of operation, whereas stream key section 506 and mapping section 508 are employed only in the stream mode of operation.

Briefly, in block mode, block key section 502 is provided with a block cipher key, such as the earlier described authentication key $K_m$ or the session key $K_s$; whereas date section 504 is provided with the plain text, such as the earlier described random number $A_n$ or the derived random number $M_i$-1. "Rekeying enable" signal is set to a "disabled" state, operatively de-coupling block key section 502 from stream key section 506. During each clock cycle, the block cipher key as well as the plain text are transformed. The block cipher key is independently transformed, whereas transformation of the plain text is dependent on the transformation being performed on the block cipher key. After a desired number of clock cycles, the provided plain text is transformed into ciphered text. For the earlier described video content protection method, when block key section 502 is provided with $K_m$ and data section 504 is provided with the $A_n$, ciphered $A_n$ is read out and used as the session key$_s$. When block key section 502 is provided with $K_s$ and data section 504 is provided with the $M_i$-1, ciphered $M_i$-1 is read out and used as the frame key $K_i$.

To decipher the ciphered plain text, block key section 502 and data section 504 are used in like manner as described above to generate the intermediate "keys", which are stored away (in storage locations not shown). The stored intermediate "keys" are then applied to the ciphered text in reversed order, resulting in the deciphering of the ciphered text back into the original plain text. Another approach to deciphering the ciphered text will be described after block key section 502 and data section 504 have been further described in accordance with one embodiment each, referencing FIGS. 6–7.

In stream mode, stream key section 506 is provided with a stream cipher key, such as the earlier described session key $K_s$ or frame key $K_i$. Block key section 502 and data section 504 are provided with random numbers, such as the earlier described session/frame keys $K_s/K_i$ and the derived random numbers $M_i$-1. "Rekeying enable" signal is set to an "enabled" state, operatively coupling block key section 502 to stream key section 506. Periodically, at predetermined intervals, such as the earlier described horizontal blanking intervals, stream key section 506 is used to generate one or more data bits to dynamically modify the then current state of the random number stored in block data section 502. During each clock cycle, in between the predetermined intervals, both random numbers stored in block key section 502 and data section 504 are transformed. The random number provided to block key section 502 is independently transformed, whereas transformation of the random number provided to data section 504 is dependent on the transformation being performed in block key section 502. Mapping block 506 retrieves a subset each, of the newly transformed states of the two random numbers, and reduces them to generate one bit of the pseudo random bit sequence. Thus, in a desired number of clock cycles, a pseudo random bit sequence of a desired length is generated.

For the illustrated embodiment, by virtue of the employment of the "rekeying enable" signal, stream key section 506 may be left operating even during the block mode, as its outputs are effectively discarded by the "rekeying enable" signal (set in a "disabled" state).

Figure 6:
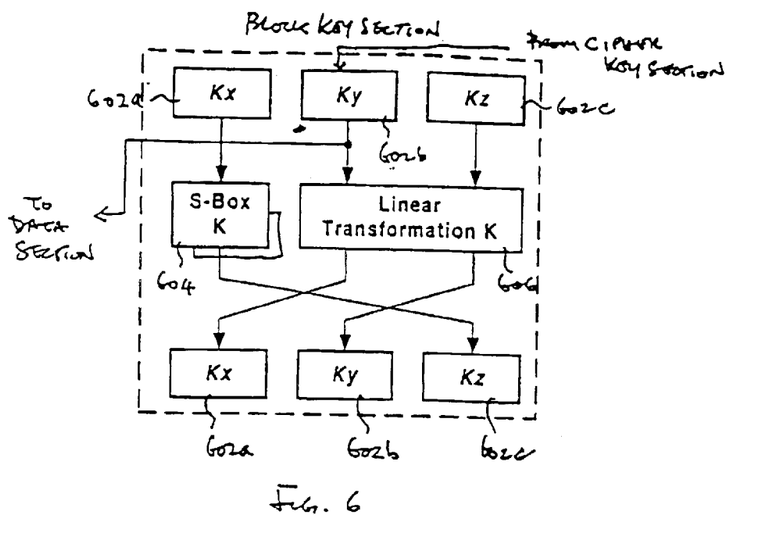
FIG. 6 illustrates the block key section of FIG. 4 in further detail, in accordance with one embodiment.

FIG. 6 illustrates the block key section of FIG. 5 in further detail, in accordance with one embodiment. As illustrated, block key section 502 includes registers 602a–602c, substitution boxes 604, and linear transformation unit 606. In block mode, registers 602a–602c are collectively initialized to a block cipher key, e.g. authentication key $K_m$ or session key $K_s$. In stream mode, registers 602a–602c are collectively initialized to a random number, e.g. session key $K_s$ or frame key $K_i$. Each round, substitution boxes 604 and linear transformation unit 606 modify the content of registers 602a–602c. More specifically, substitution boxes 604 receive the content of register 602a, modify it, and then store the substituted content into register 602c. Similarly, linear transformation unit 606 receives the content of registers 602b and 602c, linearly transforms them, and then correspondingly stores the linearly transformed content into registers 602a and 602b.

Substitution boxes 604 and linear transformation unit 606 may be implemented in a variety of ways in accordance with well known cryptographic principles. One specific implementation is given in more detail below after the description of FIG. 7.

Figure 7:
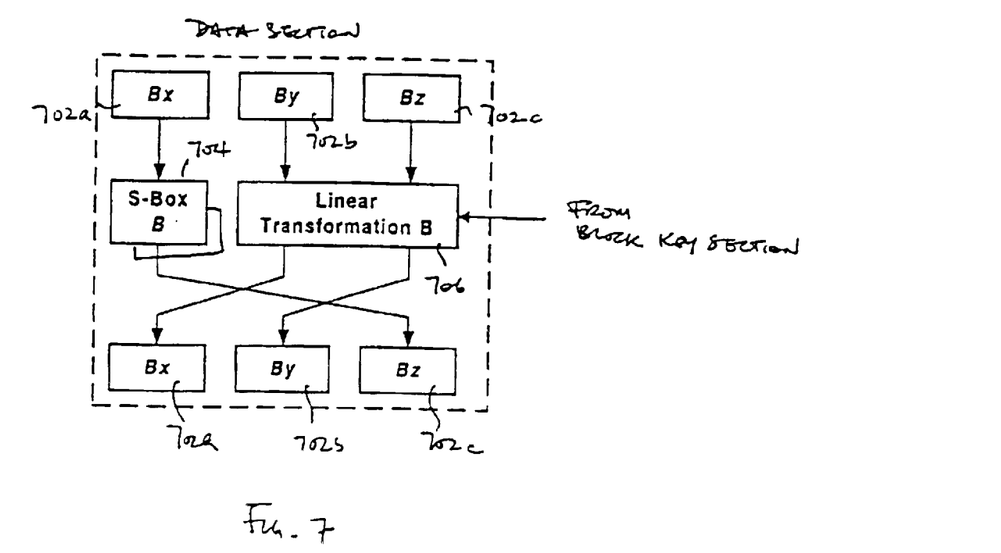
FIG. 7 illustrates the block data section of FIG. 4 in further detail, in accordance with one embodiment.

FIG. 7 illustrates the block data section of FIG. 5 in further detail, in accordance with one embodiment. For the illustrated embodiment, data section 504 is similarly constituted as block key section 502, except linear transformation unit 706 also takes into consideration the content of register 602b, when transforming the contents of registers 702b–702c. In block mode, registers 702a–702c are collectively initialized with the target plain text, e.g. earlier described random number $A_n$ or derived random number $M_i$-1 (incorporated with the n-bit copy control information). In stream mode, registers 702a–702c are collectively initialized with a random number. Each round, substitution boxes 704 and linear transformation unit 706 modify the content of registers 702a–702c as described earlier for block key section 502 except for the differences noted above.

Again, substitution boxes 604 and linear transformation unit 606 may be implemented in a variety of ways in accordance with well known cryptographic principles.

In one implementation for the above described embodiment, each register 602a, 602b, 602c, 702a, 702b, 702c is 28-bit wide. [Whenever registers 602a–602c or 702a–702cb collectively initialized with a key value or random number less than 84 bits, the less than 84-bit number is initialized to the lower order bit positions with the higher order bit positions zero filled.] Additionally, each set of substitution boxes 604 or 704 are constituted with seven 4 input by 4 output substitution boxes. Each linear transformation unit 606 or 706 produces 56 output values by combining outputs from eight diffusion networks (each producing seven outputs). More specifically, the operation of substitution boxes 604/704 and linear transformation unit 606/706 are specified by the four tables to follow. For substitution boxes 604/704, the Ith input to box J is bit I*7+J of register 602a/702a, and output I of box J goes to bit I*7+j of register 602c/702c. [Bit 0 is the least significant bit.] For each diffusion network (linear transformation unit 606 as well as 706), the inputs are generally labeled I0–I6 and the outputs are labeled O0–O6. The extra inputs for each diffusion network of the linear transformation unit 706 is labeled K0–K6.

TABLE I

Substitution performed by each of the seven constituting substitution boxes of substitution boxes 604/704.

|     | 0  | 1  | 2  | 3  | 4  | 5  | 6  | 7  | 8  | 9  | 10 | 11 | 12 | 13 | 14 | 15 |
|-----|----|----|----|----|----|----|----|----|----|----|----|----|----|----|----|----|
| SK0 | 8  | 14 | 5  | 9  | 3  | 0  | 12 | 6  | 1  | 11 | 15 | 2  | 4  | 7  | 10 | 13 |
| SK1 | 1  | 6  | 4  | 15 | 8  | 3  | 11 | 5  | 10 | 0  | 9  | 12 | 7  | 13 | 14 | 2  |
| SK2 | 13 | 11 | 8  | 6  | 7  | 4  | 2  | 15 | 1  | 12 | 14 | 0  | 10 | 3  | 9  | 5  |
| SK3 | 0  | 14 | 11 | 7  | 12 | 3  | 2  | 13 | 15 | 4  | 8  | 1  | 9  | 10 | 5  | 6  |
| SK4 | 12 | 7  | 15 | 8  | 11 | 14 | 1  | 4  | 6  | 10 | 3  | 5  | 0  | 9  | 13 | 2  |
| SK5 | 1  | 12 | 7  | 2  | 8  | 3  | 4  | 14 | 11 | 5  | 0  | 15 | 13 | 6  | 10 | 9  |
| SK6 | 10 | 7  | 6  | 1  | 0  | 14 | 3  | 13 | 12 | 9  | 11 | 2  | 15 | 5  | 4  | 8  |
| SB0 | 12 | 9  | 3  | 0  | 11 | 5  | 13 | 6  | 2  | 4  | 14 | 7  | 8  | 15 | 1  | 10 |
| SB1 | 3  | 8  | 14 | 1  | 5  | 2  | 11 | 13 | 10 | 4  | 9  | 7  | 6  | 15 | 12 | 0  |
| SB2 | 7  | 4  | 1  | 10 | 11 | 13 | 14 | 3  | 12 | 15 | 6  | 0  | 2  | 8  | 9  | 5  |
| SB3 | 6  | 3  | 1  | 4  | 10 | 12 | 15 | 2  | 5  | 14 | 11 | 8  | 9  | 7  | 0  | 13 |
| SB4 | 3  | 6  | 15 | 12 | 4  | 1  | 9  | 2  | 5  | 8  | 10 | 7  | 11 | 13 | 0  | 14 |
| SB5 | 11 | 14 | 6  | 8  | 5  | 2  | 12 | 7  | 1  | 4  | 15 | 3  | 10 | 13 | 9  | 0  |
| SB6 | 1  | 11 | 7  | 4  | 2  | 5  | 12 | 9  | 13 | 6  | 8  | 15 | 14 | 0  | 3  | 10 |

TABLES II & III

Diffusion networks for linear transformation unit 606/706 (continued in Table IV).

Diffusion Network Logic Function

| | |
|---|---|
| $O_0$ | $K_0 \oplus \phantom{I_0 \oplus} I_1 \oplus I_2 \oplus I_3 \oplus I_4 \oplus I_5 \oplus I_6$ |
| $O_1$ | $K_1 \oplus I_0 \oplus \phantom{I_1 \oplus} I_2 \oplus I_3 \oplus I_4 \oplus I_5 \oplus I_6$ |
| $O_2$ | $K_2 \oplus I_0 \oplus I_1 \oplus \phantom{I_2 \oplus} I_3 \oplus I_4 \oplus I_5 \oplus I_6$ |
| $O_3$ | $K_3 \oplus I_0 \oplus I_1 \oplus I_2 \oplus \phantom{I_3 \oplus} I_4 \oplus I_5 \oplus I_6$ |
| $O_4$ | $K_4 \oplus I_0 \oplus I_1 \oplus I_2 \oplus I_3 \oplus \phantom{I_4 \oplus} I_5 \oplus I_6$ |
| $O_5$ | $K_5 \oplus I_0 \oplus I_1 \oplus I_2 \oplus I_3 \oplus I_4 \oplus \phantom{I_5 \oplus} I_6$ |
| $O_6$ | $K_6 \oplus I_0 \oplus I_1 \oplus I_2 \oplus I_3 \oplus I_4 \oplus I_5 \oplus I_6$ |

|       | K1   | K2   | K3   | K4   | K5   | K6   | K7   | K8   |
|-------|------|------|------|------|------|------|------|------|
| $I_0$ | Kz0  | Ky0  | Ky4  | Ky8  | Ky12 | Ky16 | Ky20 | Ky24 |
| $I_1$ | Kz1  | Ky1  | Ky5  | Ky9  | Ky13 | Ky17 | Ky21 | Ky25 |
| $I_2$ | Kz2  | Ky2  | Ky6  | Ky10 | Ky14 | Ky18 | Ky22 | Ky26 |
| $I_3$ | Kz3  | Ky3  | Ky7  | Ky11 | Ky15 | Ky19 | Ky23 | Ky27 |
| $I_4$ | Kz4  | Kz7  | Kz10 | Kz13 | Kz16 | Kz19 | Kz22 | Kz25 |
| $I_5$ | Kz5  | Kz8  | Kz11 | Kz14 | Kz17 | Kz20 | Kz23 | Kz26 |
| $I_6$ | Kz6  | Kz9  | Kz12 | Kz15 | Kz18 | Kz21 | Kz24 | Kz27 |
| $O_0$ | Kx0  | Ky0  | Ky1  | Ky2  | Ky3  | Kx7  | Kx8  | Kx9  |
| $O_1$ | Kx1  | Ky4  | Ky5  | Ky6  | Ky7  | Kx10 | Kx11 | Kx12 |
| $O_2$ | Kx2  | Ky8  | Ky9  | Ky10 | Ky11 | Kx13 | Kx14 | Kx15 |
| $O_3$ | Kx3  | Ky12 | Ky13 | Ky14 | Ky15 | Kx16 | Kx17 | Kx18 |
| $O_4$ | Kx4  | Ky16 | Ky17 | Ky18 | Ky19 | Kx19 | Kx20 | Kx21 |
| $O_5$ | Kx5  | Ky20 | Ky21 | Ky22 | Ky23 | Kx22 | Kx23 | Kx24 |
| $O_6$ | Kx6  | Ky24 | Ky25 | Ky26 | Ky27 | Kx25 | Kx26 | Kx27 |

TABLE IV

Diffusion networks for linear transformation unit 606/706 (continued from Tables II & III).

|       | B1  | B2  | B3   | B4   | B5   | B6   | B7   | B8   |
|-------|-----|-----|------|------|------|------|------|------|
| $I_0$ | Bz0 | By0 | By4  | By8  | By12 | By16 | By20 | By24 |
| $I_1$ | Bz1 | By1 | By5  | By9  | By13 | By17 | By21 | By25 |
| $I_2$ | Bz2 | By2 | By6  | By10 | By14 | By18 | By22 | By26 |
| $I_3$ | Bz3 | By3 | By7  | By11 | By15 | By19 | By23 | By27 |
| $I_4$ | Bz4 | Bz7 | Bz10 | Bz13 | Bz16 | Bz19 | Bz22 | Bz25 |
| $I_5$ | Bz5 | Bz8 | Bz11 | Bz14 | Bz17 | Bz20 | Bz23 | Bz26 |
| $I_6$ | Bz6 | Bz9 | Bz12 | Bz15 | Bz18 | Bz21 | Bz24 | Bz27 |
| $K_0$ | Ky0 | —   | —    | —    | —    | Ky7  | Ky14 | Ky21 |
| $K_1$ | Ky1 | —   | —    | —    | —    | Ky8  | Ky15 | Ky22 |
| $K_2$ | Ky2 | —   | —    | —    | —    | Ky9  | Ky16 | Ky23 |
| $K_3$ | Ky3 | —   | —    | —    | —    | Ky10 | Ky17 | Ky24 |
| $K_4$ | Ky4 | —   | —    | —    | —    | Ky11 | Ky18 | Ky25 |
| $K_5$ | Ky5 | —   | —    | —    | —    | Ky12 | Ky19 | Ky26 |
| $K_6$ | Ky6 | —   | —    | —    | —    | Ky13 | Ky20 | Ky27 |

TABLE IV-continued

Diffusion networks for linear transformation unit 606/706 (continued from Tables II & III).

|       | B1  | B2   | B3   | B4   | B5   | B6   | B7   | B8   |
|-------|-----|------|------|------|------|------|------|------|
| $O_0$ | Bx0 | By0  | By1  | By2  | By3  | Bx7  | Bx8  | Bx9  |
| $O_1$ | Bx1 | By4  | By5  | By6  | By7  | Bx10 | Bx11 | Bx12 |
| $O_2$ | Bx2 | By8  | By9  | By10 | By11 | Bx13 | Bx14 | Bx15 |
| $O_3$ | Bx3 | By12 | By13 | By14 | By15 | Bx16 | Bx17 | Bx18 |
| $O_4$ | Bx4 | By16 | By17 | By18 | By19 | Bx19 | Bx20 | Bx21 |
| $O_5$ | Bx5 | By20 | By21 | By22 | By23 | Bx22 | Bx23 | Bx24 |
| $O_6$ | Bx6 | By24 | By25 | By26 | By27 | Bx25 | Bx26 | Bx27 |

Referring now back to FIG. 5, recall that a ciphered text may be deciphered by generating the intermediate "keys" and applying them backward. Alternatively, for an embodiment where either the inverse of substitution boxes 604/704 and linear transformation units 606/706 are included or they may be dynamically reconfigured to operate in an inverse manner, the ciphered text may be deciphered as follows. First, the cipher key used to cipher the plain text is loaded into block key section 502, and block key section 502 is advanced by R-1 rounds, i.e. one round short of the number of rounds (R) applied to cipher the plain text. After the initial R-1 rounds, the ciphered text is loaded into data section 504, and both sections, block key section 502 and data section 504, are operated "backward", i.e. with substitution boxes 604/704 and linear transformation units 606/706 applying the inverse substitutions and linear transformations respectively.

Other sections, such as stream key section 506 and mapping section 508, of the example combined block/stream cipher illustrated in FIG. 5, are of no particular significance to the practice of the present invention. Accordingly, they will not be "re-described" in detail here. These sections are described in detail in the parent applications.

Accordingly, a novel method and apparatus for protecting copy control information provided to a video recording device has been described.

Epilogue

From the foregoing description, those skilled in the art will recognize that many other variations of the present invention are possible. Thus, the present invention is not limited by the details described, instead, the present invention can be practiced with modifications and alterations within the spirit and scope of the appended claims.

What is claimed is:

1. A system comprising:

a video source device to provide n bits of copy control information, the video source device including a first cipher unit; and a video recording device to receive said n bits of copy control information, the video recording device including a second cipher unit;

each of the video source and recording devices incorporating said n bits of copy control information as part of an initialization value, and each of the video source and recording devices initialization a respective one of the first and second cipher units with said initialization value to practice a symmetric ciphering/deciphering process employed by the video source and recording devices to protect video transmitted from the video source device to the video recording device.

2. The system of claim 1, wherein each of said incorporation of said n bits of copy control information as part of the initialization value by said video source and recording devices comprises incorporation of said n bits of copy control information as most significant bits of the initialization value.

3. The system of claim 1, wherein each of said initialization of a cipher unit by said video source and recording devices comprises initializing a register of the cipher unit with the copy control information incorporated initialization value.

4. The system of claim 3, wherein each of said initialization of a register of the cipher unit by said video source and recording devices comprises initializing a register of a round function of a block cipher.

5. A method comprising:

providing a video source device and a video recording device with n-bits of copy control information;

incorporating said n-bits of copy control information as a part of an initialization value with each of the video source device and the video recording device;

initializing a block cipher with said initialization value; and operating said block cipher to generate a key for use by a stream cipher to cipher video to be transmitted to the video recording device.

6. The method of claim 5, wherein said incorporation of said n bits of copy control information as part of an initialization value comprises incorporation of said n bits of copy control information as most significant bits of the initialization value.

7. The method of claim 5, wherein said initialization of the block cipher unit comprises initializing a register of a round function of the block cipher.

* * * * *